(12) United States Patent
Bröker et al.

(10) Patent No.: US 11,539,178 B2
(45) Date of Patent: Dec. 27, 2022

(54) HAND-ACTUATABLE PLIER TOOL

(71) Applicant: Weidmüller Interface GmbH & Co. KG, Detmold (DE)

(72) Inventors: Thilo Bröker, Detmold (DE); Rico Schindler, Porta Westfalica (DE); Markus Speith, Paderborn (DE)

(73) Assignee: Weidmüller Interface GmbH & Co. KG

( * ) Notice: Subject to any disclaimer, the term of this patent is extended or adjusted under 35 U.S.C. 154(b) by 604 days.

(21) Appl. No.: 16/604,222

(22) PCT Filed: Apr. 24, 2018

(86) PCT No.: PCT/EP2018/060425
§ 371 (c)(1),
(2) Date: Oct. 10, 2019

(87) PCT Pub. No.: WO2018/197457
PCT Pub. Date: Nov. 1, 2018

(65) Prior Publication Data
US 2020/0036149 A1    Jan. 30, 2020

(30) Foreign Application Priority Data
Apr. 26, 2017 (DE) .......................... 102017108910.1

(51) Int. Cl.
*H01R 43/042* (2006.01)
*B25B 7/08* (2006.01)
*H02G 1/12* (2006.01)

(52) U.S. Cl.
CPC ............. *H01R 43/042* (2013.01); *B25B 7/08* (2013.01); *H02G 1/1204* (2013.01)

(58) Field of Classification Search
CPC ......... B25B 27/10; B25B 27/146; B25B 7/12; B25B 7/22; H01R 43/042; H01R 43/0486;
(Continued)

(56) References Cited

U.S. PATENT DOCUMENTS 8,407,885 B2    4/2013  Dierks et al.
9,410,875 B2    8/2016  Wagner et al.
(Continued)

FOREIGN PATENT DOCUMENTS

AU           503277      8/1979
DE    102007050176 A1    4/2009
(Continued)

*Primary Examiner* — Tyrone V Hall, Jr.
(74) *Attorney, Agent, or Firm* — Laubscher & Laubscher PC

(57) ABSTRACT

A hand-actuatable plier tool for processing cables has a plier head for handling or processing a workpiece such as a cable, two plier handles that can be pivoted relative to one another between an open position and a closed position, an electronic monitoring unit detachably arranged on a first of the plier handles and with which at least the number of handling or processing procedures can be counted and stored. The monitoring unit has an electronic circuit and a signal transmitter emitting actuation signals to the electronic circuit when the plier tool is actuated. The signal transmitter has an energy harvesting module for supplying energy to the monitoring unit and an actuation mechanism activating the signal transmitter.

15 Claims, 4 Drawing Sheets

(58) Field of Classification Search
CPC ... H01R 43/048; H01R 43/0421; H02J 50/00; H02J 50/001
See application file for complete search history.

(56) References Cited

U.S. PATENT DOCUMENTS

| | | | |
|---|---|---|---|
| 9,864,948 | B2 | 1/2018 | Glockseisen |
| 2010/0293720 | A1 | 11/2010 | Zhang |
| 2013/0233043 | A1* | 9/2013 | Kelly .................... G01B 21/16 73/1.01 |
| 2016/0078338 | A1* | 3/2016 | Glockseisen ............ B25B 7/00 377/2 |
| 2016/0094000 | A1 | 3/2016 | Deck |
| 2017/0317460 | A1* | 11/2017 | Broker ............... H01R 43/0421 |

FOREIGN PATENT DOCUMENTS

| | | |
|---|---|---|
| DE | 202010005761 U1 | 11/2011 |
| DE | 102011050718 A1 | 12/2012 |
| DE | 202014105571 U1 | 3/2016 |
| DE | 202014011110 U1 | 1/2018 |
| JP | 2016055428 A | 4/2016 |

* cited by examiner

HAND-ACTUATABLE PLIER TOOL

This application is a § 371 National Stage Entry of PCT/EP2018/060425 filed Apr. 24, 2018. PCT/EP2018/060425 claims priority of DE 102017108910.1 filed Apr. 26, 2017. The entire contents of these applications are incorporated herein by reference.

BACKGROUND OF THE INVENTION

The present invention relates to a hand-actuatable plier or crimping tool for processing cables.

In plier tools such as described in DE 20 2010 005 761 U, for example, it is known to provide an electronic monitoring unit designed as an electronic counter which counts the number of actuations performed with the plier tool.

The electronic counter of the prior art is integrated in an auxiliary tool which can be introduced into the mouth of the plier tool and which is removed from the plier mouth when not in use.

In such auxiliary tools, a disadvantage is that a number of actuations performed with the tool, which is particularly relevant for determining the useful life of the tool, cannot be accurately monitored since, when the auxiliary tool is not in use, the actuation of the plier tool is not counted. In addition, an accumulator or a battery is necessary for the operation of the auxiliary tool.

The aim of the present invention is to provide a hand-actuatable plier tool with an electronic monitoring unit, the use of which can be monitored reliably and in an energy-independent manner.

SUMMARY OF THE INVENTION

The hand-actuatable plier or crimping tool according to the invention has a plier head for handling or processing a workpiece such as a cable and two plier handles that can be pivoted relative to one another between an open position and a closed position.

On a first of the plier handles, an electronic monitoring unit is arranged, with which at least the number of handling or processing procedures can be counted and stored.

The monitoring unit has an electronic circuit and a signal transmitter emitting actuation signals to the electronic circuit when the plier tool is actuated.

The signal transmitter has an energy harvesting or collection module for supplying energy to the monitoring unit and an actuation mechanism activating the signal transmitter.

With a hand-actuatable plier tool designed in this manner monitoring the number of actuation procedures performed is enabled in a simple manner.

The use of such an energy harvesting module makes it possible to dispense with batteries or accumulators or an external energy supply connection since, with the aid of the energy harvesting module, the force applied by a user of the plier tool when pressing the plier tool together is used for supplying energy to the monitoring unit in addition to the handling of the workpiece by the plier tool. Each voltage pulse of the harvesting module is used as a trigger for counting the handling or processing procedures.

According to one embodiment of the invention, the actuation mechanism is coupled with the energy harvesting module in such a manner that at least a section of an actuation distance of the actuation mechanism can be used by the energy harvesting module for energy recovery.

Thus, it is possible to couple the actuation mechanism with the energy harvesting module so that coupling occurs only shortly before the end of a closing procedure of the plier tool.

It is also possible to exploit the entire closing distance of the plier handles with respect to one another for energy generation by the energy harvesting module and thus to harvest a higher amount of energy.

According to a preferred embodiment, the actuation mechanism has an actuation tappet which is slidably held on the first of the plier handles during pivoting of the plier handles into their closed position and which is coupled with an actuation lever of the energy harvesting module.

According to another embodiment, the monitoring unit is received in a housing which is detachably fastened on the first of the plier handles.

It is also possible to form a housing for the first of the plier handles so that the monitoring unit can be received in the plier handle housing.

This enables easy retrofitting of a plier tool with such a monitoring unit.

According to a further preferred embodiment, the actuation tappet is coupled with a first leg of a leg spring which is pivotably mounted on the housing and a second leg of the leg spring is secured to a slider which is slidably mounted in a receiving groove of the housing on which the actuation lever of the energy harvesting module is fastened.

This enables a simple and reliable transmission of the movement of one of the crimping handles to the actuation lever of the energy harvesting module.

According to another embodiment, the energy harvesting module is designed as an inductive module. In this case, the actuation lever of the energy harvesting module is used for the relative movement of a permanent magnet with respect to a coil of the energy harvesting module.

It is also possible to design the energy harvesting module as a piezoelectric module. In this case, the actuation lever is used as a pressure element for exposing a piezo crystal to pressure.

The design of the energy harvesting module as a capacitive module or as a module based on a solar cell, a thermo-electric generator or the like, is also possible.

Thus, from a plurality of different energy harvesting modules, sufficiently high energy pulses can be used for activating the electronic circuit.

According to a further embodiment, the electronic circuit has one or more display devices for outputting information such as an LED, an LCD or ePaper Display by which a direct optical feedback message can be output to the user during the actuation of the plier tool.

According to another embodiment of the invention, the monitoring unit is designed as a counter unit which can be activated by actuation of the actuation mechanism and of the energy harvesting module by which the number of actuation procedures performed can be counted.

Thus, it is possible to emit information regarding reaching a useful life value of the plier tool, when a predetermined actuation value has been reached.

In an additional embodiment of the plier tool according to the invention, the monitoring unit is designed as a wear calculation unit which can be activated by actuation of the actuation mechanism and of the energy harvesting module, wherein the monitoring unit has a first measuring unit coupled with the electronic circuit for the acquisition of a clamping force exerted during the actuation of the plier tool.

For the acquisition of a clamping force exerted during the actuation of the plier tool, this first measuring unit is preferably arranged in the area of the plier head.

The electronic circuit is preferably designed to calculate a useful life value of the plier tool from the measured clamping force values and the number of actuations of the plier tool performed.

This enables a weighting of the individual actuations, wherein larger clamping force values shorten the useful life of the plier tool overall.

According to an additional embodiment of the plier tool, the monitoring unit has a second measuring unit coupled with the electronic circuit, for acquisition of an actuation distance covered during the actuation of the plier tool.

In the case of a plier tool designed as crimping pliers, this enables an evaluation of the crimping quality of each individual crimping procedure. From the measured clamping force and the clamping distance covered in the process, by comparison with predefined target values stored in a memory of the monitoring unit, the quality of the crimp can be evaluated, and accordingly an emitted signal can be emitted or stored in a nonvolatile memory.

The second measuring unit preferably includes multiple individual harvesting modules connected one after the other, the voltage pulses of which are used when the tool is actuated as a trigger for a certain actuation distance.

It is also possible to design the second measuring unit for the acquisition of the actuation distance as the energy harvesting module. The module generates energy pulses, for example, in equidistant portions of the crimping distance, with which the electronics can record the clamping force values and combine them to form a characteristic line.

The electronic circuit is preferably designed to calculate a quality inspection value of the actuation procedure from the measured clamping force and the actuation distance of an actuation of the plier tool.

BRIEF DESCRIPTION OF THE FIGURES

A hand-actuatable plier or crimping tool according to the invention will be described in greater detail with reference to the appended drawings, in which.

DETAILED DESCRIPTION

In the following description of the figures, terms such as upper, lower, left, right, in the front of, in the rear of, etc., refer exclusively to the selected exemplary representation and position of the plier tool, plier head, plier handle, of the monitoring unit, of the energy harvesting module and the like, in the respective figures. These terms should not be understood to be limiting, i.e., these relationships can change due to different work positions or due to the mirror symmetrical design or the like.

Figure 1:
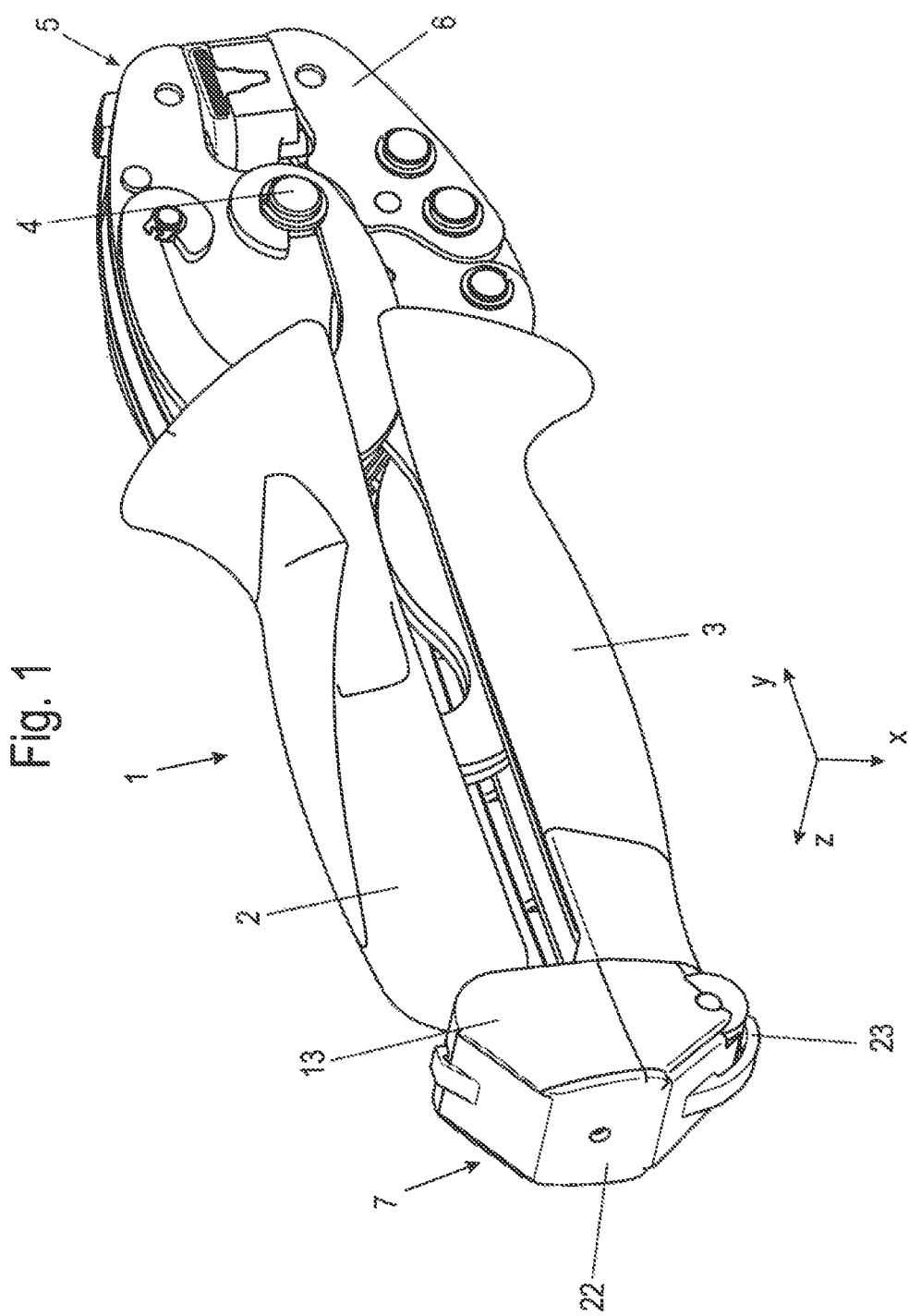
FIG. 1 is a perspective view of an embodiment of a hand-actuatable plier or crimping tool with an electronic monitoring unit mounted on one of the crimping handles.
Figure 2:
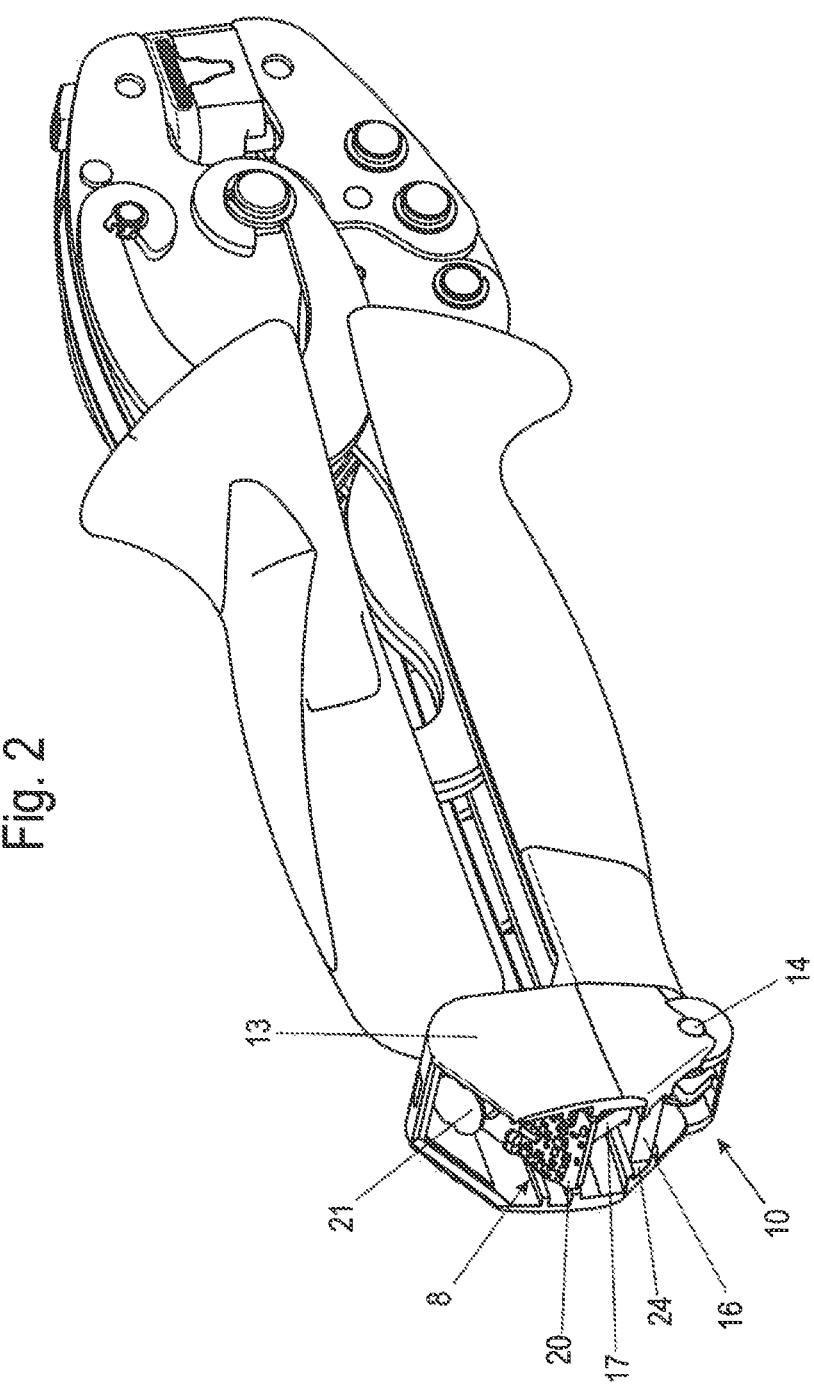
FIG. 2 is a perspective representation of the tool according to FIG. 1 with an opened housing of the monitoring unit.

In FIGS. 1 and 2, an embodiment of a hand-actuatable plier tool in the form of crimping pliers, is designated overall with the reference numeral 1. The plier tool 1 has two plier handles 2, 3 and a plier head 5 for handling or processing a cable or electrical conductor. The plier handles 2, 3 are pivotable relative to one another via a pivot bearing 4.

In addition to the design of the plier tool 1 as crimping pliers for crimping a cable or a conductor, it is also possible to design the plier tool 1 as wire stripping pliers, a cutting tool or the like.

Due to the plier handles 2, 3 being pressed together by the hand of a user, the first plier handle 3, which the lower one in FIGS. 1 and 2 and which is connected to a lower clamping jaw 6, is pivoted upward. During this pivotal movement, a toggle mechanism is extended so that the clamping jaw 6 is pivoted around the pivot bearing 4 in such a manner that the mouth of the plier head 5 of the plier tool 1 closes.

As can be seen in FIGS. 1 and 2, an electronic monitoring unit 7 is detachably fastened at the end of the lower plier handle 3 which is spaced apart from the plier head 5.

The monitoring unit 7 is enclosed by a housing 13 and a housing cover 22 closing a housing opening. On the housing cover 22, a closure or latch 23 is formed to lock the housing cover 22 in the closed position.

Figure 3:
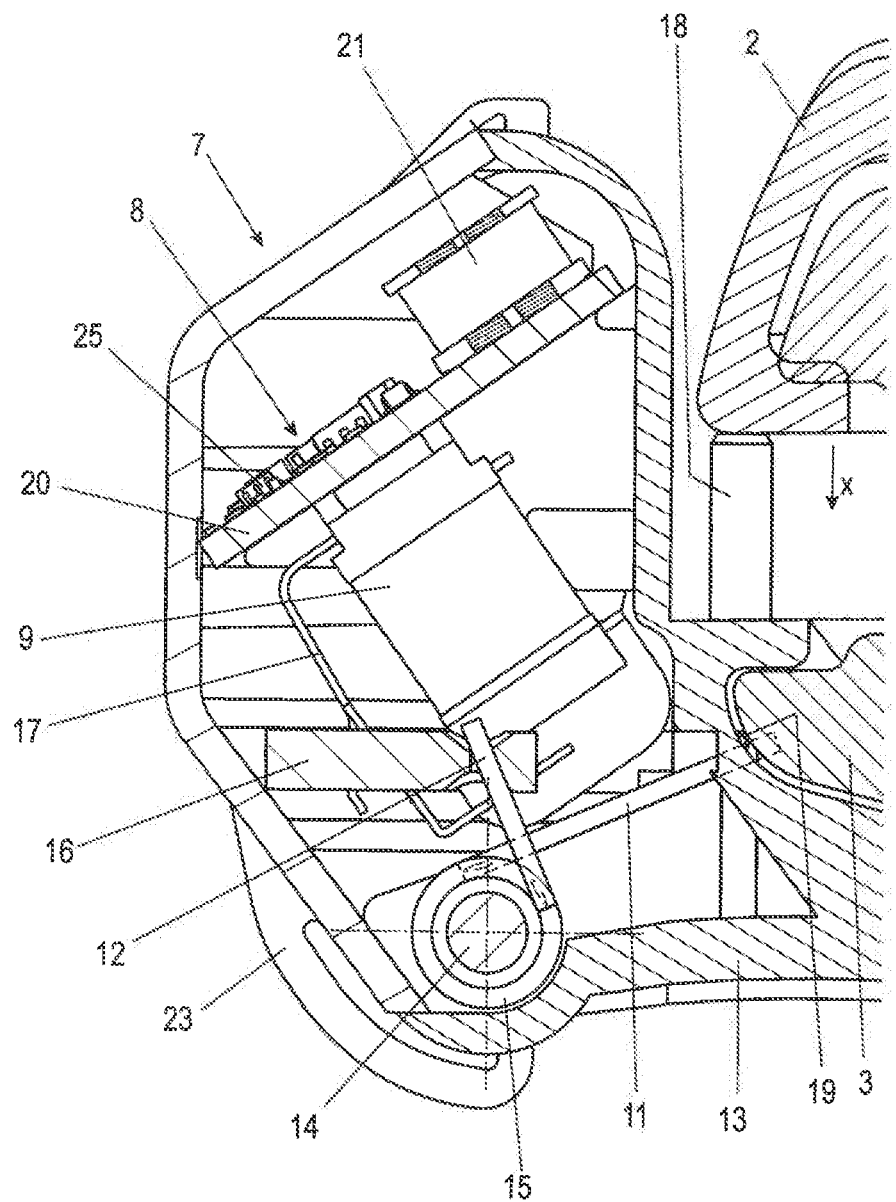
FIG. 3 is a cross-sectional view of the monitoring unit in the non-actuated state of the energy harvesting module.
Figure 4:
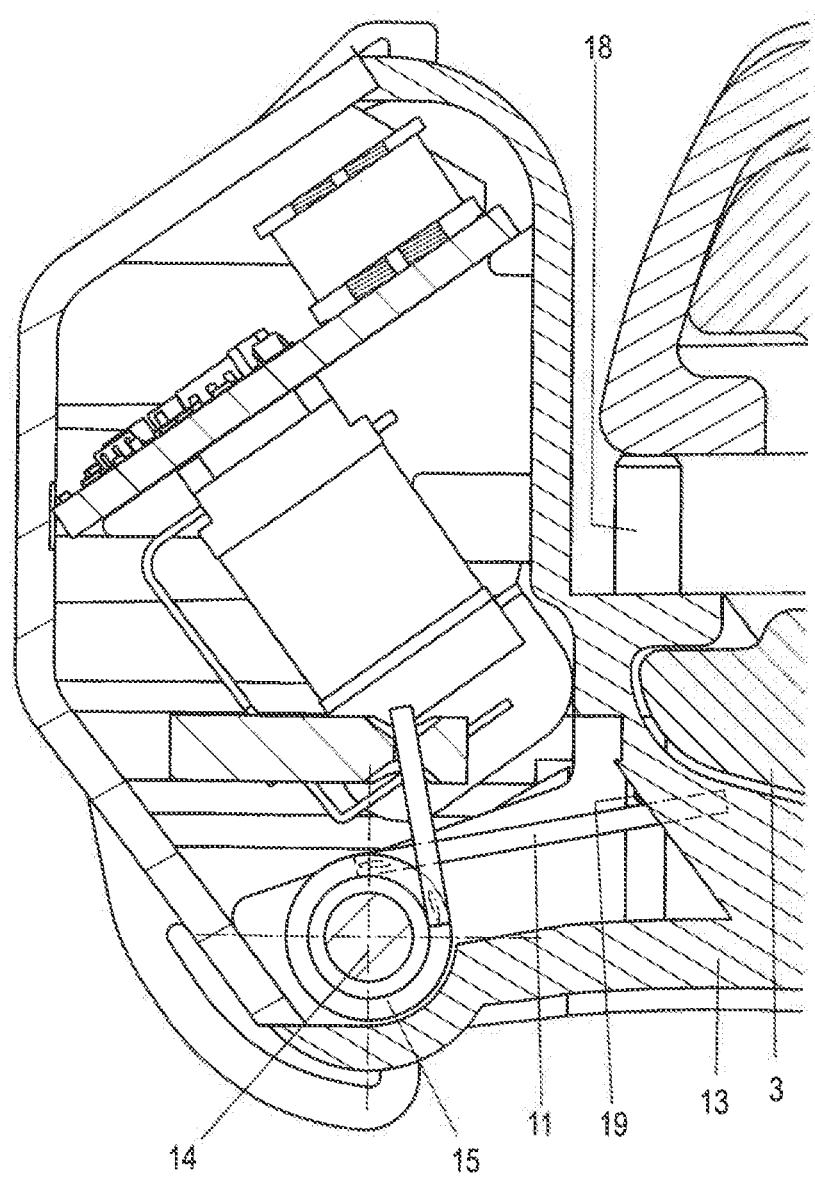
FIG. 4 is a detailed partial cross-sectional view of the monitoring unit of FIG. 3 in the actuated state of the energy harvesting module.

As shown in FIGS. 2, 3 and 4, the monitoring unit 7 has an electronic circuit 8 and a signal transmitter 25 emitting actuation signals to the electronic circuit 8 when the plier tool 1 is actuated.

This signal transmitter has an energy harvesting or collection module 9 which is used for supplying energy to the monitoring unit 7 and an actuation mechanism 10 activating the signal transmitter. It is also conceivable for the energy harvesting module 9 itself to have such an actuation mechanism.

In the embodiment shown, the energy harvesting module 9 is designed as an inductive module which is coupled via an actuation lever 17 with an actuation mechanism 10 for the conversion of mechanical energy into electrical energy.

FIG. 3 shows the monitoring unit 7 in the non-actuated state before the plier handles 2, 3 are pressed together, while FIG. 4 shows the monitoring unit 7 with the actuation mechanism 10 in the actuated state when the plier handles 2, 3 are pressed together.

As shown in FIGS. 3 and 4, the actuation mechanism 10 has an actuation tappet 18, which is firmly slidably mounted on the first of the plier handles, here the lower plier handle 3, and is pushed into an inner space of the lower plier handle 3 when the plier handles 2, 3 are pressed together.

The actuation tappet 18 is coupled with a first leg 11 of a spring 15. The coupling occurs via a clamping pin 19 arranged in the actuation tappet 18 perpendicularly relative to the movement axis of the actuation tappet 18 which carries the first leg 11 along with it during the movement in closing direction x. The spring 15 is rotatably mounted on a pivot bearing 14 designed as a pin.

The pivot bearing 14 extends perpendicularly to the closing direction x in a direction z in a recess provided in the housing 13 of the monitoring unit 7.

A second leg 12 of the spring 15 is connected with a slider 16 which is slidably mounted in a longitudinal direction of extension y of the plier tool 1 in a receiving groove 24 of the housing 13 of the monitoring unit 7.

Pivoting of the first leg 11 causes pivoting of the second leg 12 and thus sliding of the slider 16.

The spring 15 of the actuation mechanism 10 is used to damp excess travel of the actuation tappet triggered, for example, by different crimping sizes in the case of a plier tool 1 designed as crimping pliers.

The spring 15 simplifies the subsequent movement of the plier handles 2, 3 with respect to one another in an opening direction.

The slider 16 is connected with the actuation lever 17 of the energy harvesting module 9 so that sliding of the slider 16 is accompanied by an activation of the energy harvesting module 9 and converts the kinetic energy into electrical energy.

The energy harvesting module 9 is electrically connected to the electronic circuit 8 and particularly to a circuit board 20 of the electronic circuit 8.

The movement of the slider 16 when the plier handles 2, 3 are pressed together causes movement of the actuation lever 17 of the energy harvesting module 9, wherein the energy harvesting module 9 converts this kinetic energy into electrical energy and emits an energy pulse to the electronic circuit 8 which starts a microprocessor of the electronic circuit 8 and increases a counter memory by one increment via software stored in the microprocessor.

Since the electrical energy generated in the energy harvesting procedure is usually much greater than the energy needed by the processor, at least some of the remaining electrical energy is preferably used for activating a device for outputting information such as one or more LEDs.

The electronic circuit 8 preferably has a near-field communication module which can be activated via the fed-in energy of the energy harvesting module 9, in particular an NFC module, with a coil 21 used as an antenna by which the data present in a data memory of the electronic circuit 8 can be wirelessly transmitted to a mobile readout device such as a Smartphone. The near-field communication (NFC) module is suitable because of the energy-independent mode of operation for reading out the data memory.

According to another embodiment, the monitoring unit 7 is designed as a wear calculation unit which can be activated by actuating the actuation mechanism 10 and the energy harvesting module 9. The monitoring unit 7 has a first measuring unit coupled with the electronic circuit 8 for the acquisition of a clamping force exerted during the actuation of the plier tool 1.

The measuring unit is preferably arranged in the area of the plier head on the plier tool 1. However, the arrangement of this first measuring unit at another site of the plier tool 1 is also possible.

As a result, the maximum force exerted by the hand of the user during an actuation procedure can be measured which, in the electronic unit, enters into the calculation of a useful life value which can be stored in a data memory of the electronic circuit 8.

In the data memory, a value for a maximum useful life of the plier tool 1 is stored so that, by comparing this maximum useful life value with a current use value of the plier tool 1, which is calculated from the sum of the actuations performed and the weighting thereof via the force measurement of the individual actuation procedure, verification is enabled in order to determine whether the useful life value has reached the value of the maximum useful life.

When the maximum useful life is reached, a corresponding signal can be output to the user via an output unit.

In an additional embodiment of the plier tool 1, the monitoring unit 7 has a second measuring unit coupled with the electronic circuit 8 which is used for the acquisition of an actuation distance covered during the actuation of the plier tool 1.

The measurement of the actuation distance together with a measurement of the applied clamping force enables the calculation of a quality inspection value, for example for the qualitative inspection of a crimp, wherein the measured quality inspection value or a quality inspection curve calculated from multiple quality inspection values of this type is compared with a stored target value or target curve.

The second measuring unit preferably includes multiple individual harvesting modules connected one after the other, the voltage pulse of which is used during the actuation of the tool as a trigger for a certain actuation distance.

With each harvesting procedure, a force value is stored which then is converted into a curve. The curve thus obtained can subsequently be compared with a preset curve.

It is also conceivable that the energy harvesting module 9 itself is a position sensor. For this purpose, the energy harvesting module 9 generates energy pulses, for example, in equidistant sections of the actuation distance of the plier tool 1, with which the electronic circuit can record the clamping force values and distance points and combine them to form a characteristic line.

The use of an individual additional energy harvesting module is also possible.

In addition to the design of the energy harvesting module 9 as an inductive module, it is also possible to design the energy harvesting module 9 as a capacitive or piezoelectric module or as a module based on thermal energy or the like.

The invention claimed is:

1. A hand-actuatable plier tool, comprising:
    (a) a plier head for handling a workpiece;
    (b) two plier handles pivotably connected with one another for movement between an open position and a closed position;
    (c) an electronic monitoring unit arranged on a first of said plier handles and within which at least a number of handling procedures can be counted and stored; and
    (d) said electronic monitoring unit including an electronic circuit and a signal transmitter emitting actuation signals to said electronic circuit when the plier tool is actuated, said signal transmitter including an energy harvesting module for supplying energy to said monitoring unit and an actuation mechanism which activates the signal transmitter.

2. The plier tool as defined in claim 1, wherein said actuation mechanism is coupled with said energy harvesting module in such a manner that at least a section of an actuation distance of said actuation mechanism can be used by said energy harvesting module to collect energy for said signal transmitter.

3. The plier tool as defined in claim 1, wherein said actuation mechanism includes an actuation tappet slidably retained on said first plier handle during pivotal movement of said plier handles into the closed position and which is coupled with an actuation lever of said energy harvesting module.

4. The plier tool as defined in claim 3, and further comprising a housing removably connected with said first plier handle, said electronic monitoring unit being arranged in said housing.

5. The plier tool as defined in claim 4, and further comprising a spring pivotably mounted on said housing and a slider slidably mounted within a groove of said housing, said actuation tappet being coupled with a first leg of said spring, a second leg of said spring connected with said slider, said actuation lever being fastened to said slider.

6. The plier tool as defined in claim 1, wherein said energy harvesting module comprises one of an inductive, piezoelectric and capacitive module.

7. The plier tool as defined in claim 1, characterized in that the electronic circuit includes at least one display device.

8. The plier tool as defined in claim 1, wherein said electronic monitoring unit comprises a counting unit which is activated by actuation of said actuation mechanism of said energy harvesting module.

9. The plier tool as defined in claim 1, wherein said electronic monitoring unit comprises a wear calculation unit which is activated by actuation of said actuation mechanism of said energy harvesting module, and wherein said electronic monitoring unit includes a first measuring unit coupled with said electronic circuit for acquisition of a clamping force exerted during actuation of the plier tool.

10. The plier tool as defined in claim 9, wherein said first measuring unit for the acquisition of a clamping force exerted during the actuation of the plier tool is arranged near said plier head.

11. The plier tool as defined in claim 10, wherein said electronic circuit calculates a useful life value of the plier tool from the measured clamping force values and the number of actuations performed by the plier tool.

12. The plier tool as defined in claim 11, wherein said electronic monitoring unit includes a second measuring unit coupled with said electronic circuit for acquiring an actuation distance covered during actuation of the plier tool.

13. The plier tool as defined in claim 12, wherein said electronic circuit calculates a quality inspection value of the actuation procedure from the measured clamping force value and the actuation distance of an actuation of the plier tool.

14. The plier tool as defined in claim 13, wherein said energy harvesting module comprises said second measuring unit.

15. The plier tool as defined in claim 1, wherein the plier tool comprises enone of crimping pliers and wire stripping pliers.

* * * * *